Patented May 1, 1951

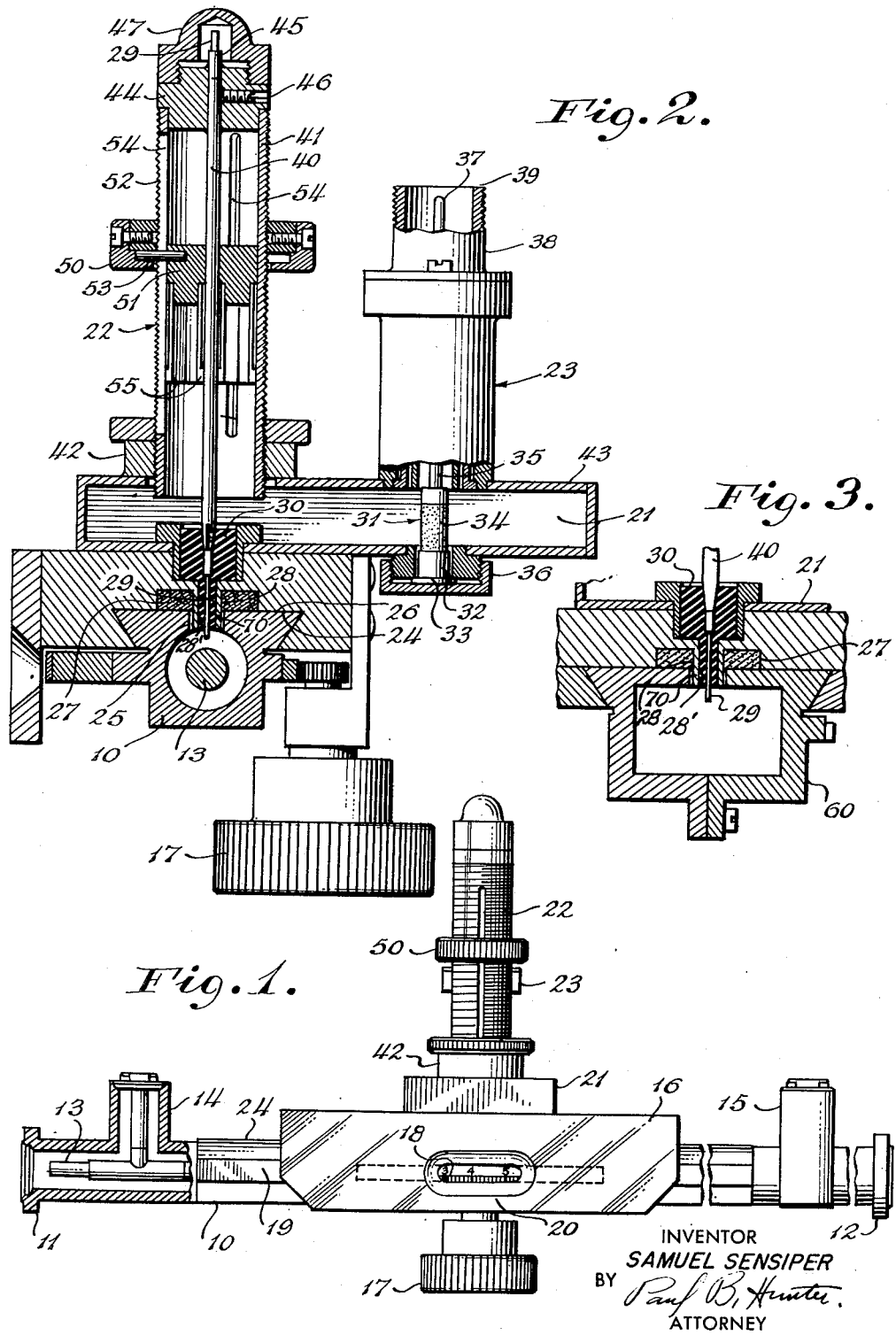

2,551,398

UNITED STATES PATENT OFFICE 2,551,398

APPARATUS FOR MEASURING ULTRA HIGH FREQUENCY FIELD DISTRIBUTIONS

Samuel Sensiper, Garden City, N. Y., assignor to The Sperry Corporation, a corporation of Delaware Application May 17, 1946, Serial No. 670,391

2 Claims. (Cl. 178—44)

This invention relates to ultra-high-frequency electrical apparatus and more particularly to improvements in standing wave detectors using travelling probes.

The conventional standing wave detector consists of a section of coaxial line with a slot running along the outer conductor to permit loose coupling of a radio-frequency voltmeter probe to the line. Such a slotted section is used to determine the ratio of voltage amplitudes at voltage nodes and anti-nodes of standing waves along the line, and to determine the relative positions of these nodes and anti-nodes. From such data it is possible to determine the resistive and reactive nature of a load coupled to the line. Considerable care must be taken in the design of such standing wave detectors that the probe shall respond only to the standing wave in the coaxial line. Any radiation leaking out through the slotted section which might later be reflected back to the probe and picked up by it, makes standing wave measurements highly inaccurate. Also, it is quite possible for electromagnetic energy from some other undesirable source to enter the slotted section through the slot and thereby cause a false reading. It is also possible for the pickup probe itself to act as a small antenna and to radiate some of the electromagnetic energy by which it is excited. This radiated energy may be reflected back to the probe or otherwise cause further inaccuracies in the measurement.

The principal object of this invention is to provide an ultra-high-frequency energy absorber in the immediate neighborhood of a pickup probe or coupling device or other member which communicates with the interior of an enclosed-conductor type of transmission system or standing-wave enclosure, so that undesirable electromagnetic energy will be prevented from interfering with the desired fields of such a system or enclosure.

Another object of the present invention is to provide a travelling probe that is unaffected by undesirable outside sources of electromagnetic energy.

A further object of the present invention is to provide a travelling probe having an energy trap which prevents undesired energy from affecting the probe, such an energy trap having little or no frequency sensitivity.

Briefly, the present invention provides the usual slotted coaxial line or wave guide with a travelling probe whose carriage has a large bearing surface and slides along the slotted coaxial line or wave guide section. The novel feature in this travelling probe lies in the use of a block or blocks of electromagnetic-energy-absorbing material inserted in the bearing surface of the probe carriage in the neighborhood of the probe. An example of such material that has been found to be very effective is that sold under the trade name "Polyiron." This material comprises small particles of iron, or powdered iron, held together by a binder of dielectric material such as Bakelite, and is well known in the radio art for use as magnetic cores in intermediate frequency and radio frequency transformers. It is described in "Iron Core Intermediate Frequency Transformers" by Alfred Crossley, on page 298 of the November 1933 issue of Electronics Magazine, published by McGraw-Hill Co., New York, N. Y. By placing such energy-absorbing material at the bearing surface of the travelling probe, an energy sink of microwave energy is provided. This energy sink absorbs both the incident energy from outside sources as well as any energy which the pickup probe or the slot may tend to radiate when acting as an antenna. It can readily be seen, therefore, that by inserting suitable energy-absorbing units, such as "Polyiron" members, in the immediate vicinity of the pickup probe outside of the outer conductor of the slotted coaxial line section, the response of the pickup probe is confined to the energy represented by the standing wave which exists in the coaxial line, and spurious response is minimized.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects and advantages will become apparent from the specification, taken in connection with the accompanying drawing wherein:

Fig. 1 is a side elevation view partly in cross-section of a coaxial-line-type of standing-wave detector incorporating a preferred embodiment of this invention;

Fig. 2 is an end elevation view partly in cross-section of the standing wave detector shown in Fig. 1, viewed from the right side thereof; and Fig. 3 is a fragmentary and elevation view, partially in cross-section, of a standing wave detector of the wave guide type incorporating the present invention.

Reference to Fig. 1, which is a side elevation view of a coaxial-line-type standing-wave detector, shows a slotted coaxial line section 10 which is terminated at each end in a standard coaxial line coupling member 11 and 12. The center conductor 13, of the line is supported by conventional T-stub supports 14 and 15 at each end of the slotted line section 10. Probe carriage 16 is supported by a bearing surface 24 on slotted line section 10 and is capable of being moved in translation by rotation of knob 17. Such translatory motion may be calibrated and indicated by the aid of scale 18 engraved on the outer front face 19 of slotted section 10. A small vernier scale 20 used for accurate reading is provided on the face of probe carriage 16. Rigidly mounted on top of probe carriage 16 is a wave guide coupling section 21 which supports a tuning unit 22 and a radio-frequency detector unit 23.

Fig. 2, which is an end elevation view of the standing wave detector shown in Fig. 1 partly in cross section, shows the details of probe carriage 16, wave guide coupling unit 21, tuning unit 22 and R. F. detector unit 23. As can best be seen in this figure, slotted line section 10 has a large flat upper bearing surface 24 through which is cut longitudinal slot 25. Inserted in the base of the adjacent bearing surface 26 of probe carriage 16 is a slab of electromagnetic-energy-absorbing material 27. This slab 27 runs the length of probe carriage 16. A hole 28 is provided in the slab 27 to permit a sleeve-like portion 70 of probe carriage 16 to project downwardly into slot 25. An opening 28' in the portion 70 allows the probe 29 to pass therethrough to communicate with the interior of coaxial line section 10. A dielectric supporting bushing 30 is used to maintain probe 29 in a relatively coaxial probe within sleeve-like portion 70 of relation carriage 16. The probe element 29 and sleeve-like portion 70 thus cooperate as a coaxial line probe unit.

Probe 29 extends through probe carriage 16, across a wave guide coupling unit 21, and along the length of cylindrical turning unit 22. Wave guide coupling unit 21 is excited by the section of the probe 29 which passes through it. The electromagnetic field oscillations which are set up in the wave guide coupling unit 21 are rectified by radio-frequency detector unit 23. This radio frequency detector unit 23 is of conventional type having a crystal detector cartridge 31 supported across the wave guide coupling unit 21. This crystal detector cartridge 31 comprises a metal base 32 with metal cap 33, an insulator body 34, and a probe or terminal pin 35. Knurled metal cap 36 is provided for holding crystal detector cartridge 31 in place and for permitting its easy replacement.

The metal probe or terminal pin 35 is insulatingly supported in the center of detector unit 23 and is electrically connected to center pin 37 of the coaxial output connection 38. This output connection 38 has its outer conductor 39 threaded in order to make good mechanical and electrical connection to an output cable or any other output connector.

Probe tuning unit 22 is provided to permit efficient coupling between probe 29 and radio-frequency detector unit 23. Member 40 is provided with a bore to receive probe 29, and they coextend from dielectric bushing 30 to the upper end of cylindrical tuning unit 22. Tuning unit 22 consists of a metal cylinder 41 which is threadedly coupled to wave guide coupling unit 21 by a metal bushing 42 which is rigidly fastened to the upper wall 43 of wave guide coupling unit 21, and within which cylinder 41 is threaded. A metal plug 44 is fixed in the open end of cylinder 41 and supports coaxial member 40 and probe 29 at their upper ends, so as to maintain their coaxial position inside cylinder 41. The vertical position of probe 29 can be manually adjusted at the upper end 45 of coaxial member 40 by sliding it inside and along member 40. A set screw 46, mounted in metal plug 44, engages probe 29 through an opening in member 40 to maintain the vertical adjustment of probe 29. The metal cap 47, which is threadedly engaged to metal plug 44, covers the exposed end of probe 29 projecting upwardly from member 40 where they protrude through metal plug 44.

Tuning ring 50 is used to vary the position of a shorting plug 51 inside the tuning unit 22. Shorting plug 51 short-circuits conductor 40 to cylinder 41. As tuning ring 50 is rotated, it moves in translation along cylindrical tube 41 by virtue of the external threads 52 on the outer surface of cylinder 41. This translatory motion along the axis of cylinder 41 is transferred to shorting plug 51 by means of pins 53 which pass through longitudinal slots 54 in the wall of cylinder 41 and rotate freely within ring 50. A plurality of metal fingers 55 extend from the shorting plug 51 along the inside wall of cylinder 41 and along the outer wall of coaxial member 40 to provide good electrical contact between these members and shorting plug 51.

In operation, the slotted coaxial line section 10 is connected in tandem in the transmission system whose standing wave ratio it is desired to measure. Since the slotted coaxial section 10 is terminated in standard coupling members 11 and 12, little difficulty is experienced in inserting such a line section 10 in the system. Probe-carriage 16 is moved in translation along slotted coaxial section 10 by rotation of knob 17. If the terminal 37, 39 of radio frequency detector unit 23 is connected to a suitable indicating unit, say a milliameter, readings proportional to the amplitude of the standing wave at various positions along the slotted section 10 will be indicated. By rotating metal tuning ring 50, the wave guide coupling unit 21 can be tuned to give maximum coupling from pickup probe 29 to radio frequency detector unit 23. If greater coupling between the coaxial line section 10 and the pickup probe 29 is desired, the probe 29 may be made to protrude further into the coaxial member 40. Such adjustment may be maintained by tightening set screw 46 which locks the probe 29 in its vertical position within coaxial member 40.

By virtue of the presence of electromagnetic-energy-absorbing slab 27 through which the probe 29 passes, energy from external sources which finds its way down the small crack between the upper bearing surface 24 of the coaxial line section 10 and the adjacent bearing surface 26 of the probe-carriage 16 is prevented from reaching probe 29. Instead it is absorbed by the slab 27. In like manner, should the probe 29 act as a radiator of the energy which it picks up in the coaxial line, such energy could not be reflected back to the probe 29 because of its absorption by surrounding slab 27. This absorption of undesired incident energy as well as the absorption of any energy which the probe 29 radiates is in no way frequency sensitive, if the attenuation characteristic of the energy-absorbing material with respect to frequency is approximately constant over the range which the device is operable. Thus, should the undesired incident energy be appreciably removed in frequency from the frequency of the energy being measured in the device, the absorbing slab 27 will still successfully prevent this undesired energy from reaching the pickup probe 29, thus preventing inaccurate readings.

Although in the embodiment shown of the present invention, the pickup device is mounted on a slotted coaxial line, it will be obvious to one versed in this art that the invention is equally advantageous in other enclosed-conductor types of transmission systems, such as of the wave guide type.

An example of such a wave guide type of standing wave detector incorporating the present invention is shown in Fig. 3. In this device a slotted section of rectangular guide 60 is used as the energy-conducting member in place of the coaxial line section 10 of Fig. 1. As in the embodiment shown in Fig. 1, energy-absorbing member 27 is provided adjacent to probe 29 with an opening 28 to permit probe 29 to communicate with the interior of wave guide member 60. This energy-absorbing member 27 prevents undesired energy from external sources from reaching probe 29. It further prevents energy which might be radiated by probe 29 from later being reflected back to the probe 29, thereby causing incorrect readings.

It should be pointed out that the invention is not limited in any way to the use of any particular microwave energy-absorbing material, such as "Polyiron," or to its specific location herein illustrated, but in its true sense includes any manner of providing a microwave energy sink in the immediate neighborhood of the opening from which or into which radiation is to be prevented.

It is further desired to point out that, although in its preferred embodiment the invention is used in conjunction with a pickup probe, in its broader aspects it is equally advantageous when used with any other type of coupling devices, or with any member (such as a tuning or shorting device) which passes through the outer wall of an ultra-high-frequency energy conductor or resonator. Its use in such devices is to prevent the radiation of energy which might leak out through any openings between such devices and the outer wall of such an ultra-high-frequency conductor or resonator, and to prevent the entry through such openings of undesired energy from external sources.

What is claimed is:

1. Apparatus for measuring ultra high frequency field distributions comprising an electromagnetic wave energy conduit having an enclosing wall provided with a longitudinal slot, a pair of conductive metal bearing surfaces extending along the outside of said wave conduit adjacent each side of said slot, a probe carriage having a pair of correlated bearing surfaces slidably engaging said first mentioned bearing surfaces for motion of said carriage along said slot, a pickup probe unit supported by said carriage and comprising a conductive sleeve integral with said carriage and extending through said slot and spaced from the edges thereof and terminating substantially flush with the inner surface of said wall of said wave conduit, and an inner conductor substantially coaxial with said sleeve and extending into said wave conduit beyond said inner surface as the probe element therein, and a block of ultra high frequency energy absorbing material comprising finely divided particles of ferromagnetic material suspended in a solid dielectric material, said block being disposed between said bearing surfaces on said carriage, surrounding said sleeve and extending substantially the length of said carriage adjacent said slot, and in contact substantially throughout its length with the outside wall of said wave conduit.

2. Ultra high frequency electromagnetic wave energy apparatus comprising an electromagnetic wave conduit having an enclosing wall provided with a longitudinal slot, a probe carriage movable along said slot, a probe unit supported by said carriage and comprising a coaxial line having its outer conductor ending substantially flush with the inner surface of said wall and its inner conductor extending therebeyond into the interior of said conduit as the probe element therein, and a body of ultra high frequency energy absorbing material comprising finely divided particles of ferromagnetic material suspended in a solid dielectric material, said body surrounding said probe unit between said carriage and the outside surface of said wall of said wave conductor, and extending substantially throughout the portion of said carriage adjacent said slot.

SAMUEL SENSIPER.

REFERENCES CITED

The following references are of record in the file of this patent:

UNITED STATES PATENTS

| Number | Name | Date |
|---|---|---|
| 1,984,526 | Given | Dec. 18, 1934 |
| 2,293,839 | Linder | Aug. 25, 1942 |
| 2,402,663 | Ohl | June 25, 1946 |
| 2,404,797 | Hansen | July 30, 1946 |
| 2,409,640 | Moles | Oct. 22, 1946 |
| 2,412,805 | Ford | Dec. 17, 1946 |
| 2,439,527 | Paulson | Apr. 13, 1948 |
| 2,443,109 | Linder | June 8, 1948 |
| 2,454,042 | Dettinger | Nov. 16, 1948 |
| 2,465,719 | Fernsler | Mar. 29, 1949 |